(12) United States Patent
Trott

(10) Patent No.: US 6,728,449 B2
(45) Date of Patent: Apr. 27, 2004

(54) FIBER ASSEMBLY ALIGNMENT USING FIDUCIALS

(75) Inventor: Gary R. Trott, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 86 days.

(21) Appl. No.: 10/077,464

(22) Filed: Feb. 14, 2002

(65) Prior Publication Data

US 2003/0152328 A1 Aug. 14, 2003

(51) Int. Cl.[7] .................................................. G02B 6/30
(52) U.S. Cl. .............................. 385/49; 385/52; 385/90
(58) Field of Search .............................. 385/49, 16–24, 385/52, 89, 90, 92

(56) References Cited

U.S. PATENT DOCUMENTS

| | | | | |
|---|---|---|---|---|
| 5,179,609 A | * | 1/1993 | Blonder et al. ............... | 385/89 |
| 5,771,323 A | | 6/1998 | Trott ............................ | 385/35 |
| 5,848,211 A | | 12/1998 | Yang et al. .................... | 385/93 |
| 5,930,429 A | | 7/1999 | Trott ............................ | 385/93 |
| 5,937,114 A | | 8/1999 | Fisher et al. .................. | 385/14 |
| 6,139,972 A | | 10/2000 | Trott et al. ................... | 428/458 |
| 6,195,478 B1 | | 2/2001 | Fouquet ....................... | 385/17 |

* cited by examiner

*Primary Examiner*—Phan T. H. Palmer

(57) ABSTRACT

An assembly and an optical element have fiducials for alignment of multiple beam paths during fabrication of an optical device. In an assembly including a substrate with machined grooves for optical fibers, a fiducial can be a carbon-coated fiber or other object disposed in one of the grooves. In an assembly including a collimator array, a fiducial can be an opaque collimator lens. Alternatively, photolithographic processes can provide the required positional accuracy for fiducials on the assembly and/or the optical element. During alignment, a computer-controllable process can use machine vision or distance measurements to identify the position and the orientation of the assembly relative to the optical element. Based on the identified position and orientation, the process moves the assembly to the target position and orientation that provide sufficient optical power flow through the optical element for a fine alignment process.

23 Claims, 3 Drawing Sheets

FIBER ASSEMBLY ALIGNMENT USING FIDUCIALS

BACKGROUND

Planar lightwave circuits such as waveguide gratings and optical switches control the routing of optical signals. In order to accomplish this control or routing, input and output optical fibers are connected to the planar lightwave circuit (PLC). A convenient method to align and manage more than one fiber is to use fiber assemblies.

FIG. 1A shows the example of an optical switch 100 with four fiber assemblies 110A, 110B, 110C, and 110D for four sets of optical fibers 112. The four fiber assemblies 110A, 110B, 110C, and 110D are connected to an optical plate 120 that forms a PLC. In this example, fiber assemblies 110A and 110D include optical fibers 112 that input optical signals to optical plate 120 and fiber assemblies 110B and 110C include optical fibers 112 that receive optical signals output from optical plate 120.

In general, optical plate 120 can be made of any material in which optical waveguides can be created. These materials generally have low optical loss for the target wavelengths and a refractive index profile can be created perpendicular to the propagation direction so as to guide the light. In the example of FIG. 1A, optical plate 120 is made of an optical material such as fused silica that is selectively doped with impurities to form optical waveguides, but waveguides can be formed in other structures such as in semiconductor lasers and Lithium Niobate (LiNbO$_3$) modulators.

Optical plate 120 includes two example sets of optical waveguides 122 and 124. Optical waveguides 122 are aligned with optical fibers 112 in fiber assemblies 110A and 10C, and optical waveguides 124 are aligned with fibers 112 in fiber assemblies 110B and 110C. Switching sites 126 that select the paths of the optical signals are at the intersections of optical waveguides 122 and 124.

In operation, switching sites 126 can be individually turned on or off so that an optical signal input to an optical waveguide 122 or 124 either reflects at one of the switching sites 126 along the waveguide 122 or 124 into another optical waveguide 124 or 122 or passes through every switching site 126 along the optical waveguide 122 or 124. In one specific implementation, each switching site 126 includes a trench in optical plate 120 that is either filled with a liquid to make the switching site 126 transparent or filled with a gas bubble to make the switching site 126 reflective. An integrated circuit (not shown) underlying optical plate 120 can selectively heat the liquid in a particular switching site 126 to create the gas bubble that turns on that switching site 126 and makes that switching site 126 reflective.

Optical switch 100 can route an optical signal from an optical fiber 112 in fiber assembly 110A, for example, into any of the optical fibers 112 in fiber assembly 1110B by making the appropriate switching sites 126 reflective. Alternatively, if none of the switching sites 126 along the optical waveguide 122 are reflective, the optical signal from the optical fiber 112 in fiber assembly 110A passes through optical plate 120 to an optical fiber 112 in the opposite fiber assembly 110C.

Proper operation of optical switch 100 requires that the spacing of optical fibers 112 on each fiber assembly 110A, 110B, 110C, or 110D match the spacing of input/output areas for the corresponding optical waveguides 122 or 124. Additionally, the optical fibers 112 must be precisely aligned with optical waveguides 122 or 124 and with optical fibers 112 in other fiber assemblies to achieve maximum performance. Fabricating and aligning fiber assemblies with the required precision can present difficulties because waveguides 122 and 124 have typical dimensions of about 10 μm or less and a standard optical fiber 112 has a diameter of 125 μm and a core 10 μm in diameter. The cores of the optical fibers 112 carry the optical signals and must be aligned for transfer of optical signals to or from the corresponding waveguide. Accordingly, for maximum performance the spacing and alignment of the optical fibers 112 typically must be accurate to within a few tenths of a micron.

FIG. 1B shows a cross-sectional view of a fiber assembly 110. Fiber assembly 110 includes a substrate 115 having v-grooves 116 in which optical fibers 112 reside. Substrate 115 is typically made of the same material as the optical plate (e.g., fused silica) to provide a matching coefficient of thermal expansion (CTE), but other materials such as silicon can also be used.

Precision machining of substrate 115 can produce v-grooves 116 with consistent shape and spacing. Such machining can use, for example, step and repeat techniques that grind a v-groove 116 in substrate 115 then move substrate 115 the required distance for grinding the next v-groove 116 in substrate 115. Equipment including a precision stage that positions substrate 115 for grinding can achieve the required precision for the spacing of v-grooves 116. However, separate mechanical operations such as cutting an edge 118 of substrate 115 generally require remounting substrate 115 on different equipment, which introduces variations greater than the required alignment precision. Accordingly, the position of edge 118 of substrate 115 relative to v-grooves 116 may vary by ±25 μm.

An exemplary process for aligning fiber assemblies 110A, 110B, 110C, and 110D with optical plate 120 as in FIG. 1A includes a coarse alignment process and a fine alignment process. The coarse alignment process aligns fiber assemblies 110A, 110B, 110C, and 110D and optical plate 120 with sufficient precision to provide some light flow through the required paths. A fine alignment process measures the intensity of output optical signals and adjusts the positions and orientations of assemblies 120 to maximize optical power flow through switch 100. Fine alignment can be computer controlled using known "hill climbing" algorithms that find the optimal position and orientation for the fiber assemblies 110A, 110B, 110C, and 110D.

Coarse alignment of an assembly 110 and an optical plate 120 aligns the cores 114 of optical fibers 112 with respective optical waveguides 122 or 124 in optical plate 120 so that optical signals flow through optical switch 100. Coarse alignment initially relies on identifying and matching physical features of fiber assembly 110 and optical plate 120. However, cores 114, which are to be aligned, are indistinguishable from other portions of optical fibers 112, and the optical fibers 112, which have their protective sheathes removed for accurate assembly, are transparent and therefore difficult to identify using machine or human vision. Features such as v-grooves 116 or their edges are similarly difficult to identify, particularly when substrate 115 is transparent. Separate mechanically made features such as edges 118 of substrate 115, which may be easier to identify, are subject to variations much greater than those required in the coarse alignment.

The difficulties in identifying reliable reference features for coarse alignment typically means that the coarse alignment is conducted manually. Additionally, an alignment based solely on the apparent location of the features often fails to provide adequate optical power transmission for the fine alignment process. Accordingly, the coarse alignment must further include a search process that systematically shifts or reorients the fiber assemblies until achieving a configuration with sufficient optical power transmission for the fine alignment process. Such coarse alignment procedures can take an hour or more, while computer-controlled fine alignment can typically be completed in two to ten minutes. Accordingly, structures and techniques are sought that can reduce the time required for aligning fiber assemblies in optical switches or other PLCs.

SUMMARY

In accordance with an aspect of the invention, both a fiber assembly and an optical plate containing a light circuit have fiducials for coarse alignment of the fiber assembly during fabrication of an optical device. In a fiber assembly including a substrate with machined grooves for optical fibers, a fiducial can be disposed in one of the grooves so that the accuracy of the reference position that the fiducial provides is approximately the same as the accuracy of the positions of the optical fibers. In one embodiment, the fiducial on the fiber assembly is an opaque fiber such as a carbon-coated optical fiber. The centroid of the opaque fiber marks the center of the groove containing the opaque fiber and indicates to the accuracy with which the grooves were formed the positions of other grooves and the optical fibers in the other grooves. As an alternative to the opaque fiber, any opaque or easily visible structure such as a wire or a hypodermic needle having a uniform diameter or thickness can be placed in a groove, or the groove can be otherwise filled with an opaque material.

Photolithographic processes can form optical waveguides, switching sites, and fiducials in the optical plate. Since photolithographic processes conventionally use alignment marks to align successive operations, such processes can provide the required positional accuracy for the fiducials formed on the optical plate even if formation of the fiducials is before or after the processes that form the optical waveguides and switching sites.

In accordance with a further aspect of the invention, photolithographic processes can form grooves in a substrate for a fiber assembly and form fiducials as regions of opaque material on the substrate. Unlike mechanical processes that generally do not use alignment marks for precise alignment of separate processes, the photolithographic processes can position the fiducials accurately relative to the grooves and thereby permit use of the fiducials for aligning the fiber assembly with an optical plate.

Machine vision, interferometer measurements, or other computer controllable processes using appropriate sensors can identify the positions and orientations of fiducials on fiber assemblies and on an optical plate during alignment of the assemblies. Using the appropriate sensors, the coordinates for all 6 degrees of freedom can be identified for both parts. Based on the identified positions and orientations, the computer-controlled alignment process moves the fiber assemblies relative to the optical plate to the coarsely aligned positions that reliably provide light flow through the device. This is much faster than the manual searching technique described above. A fine alignment process can then use "hill climbing" techniques to position the fiber assemblies for maximum power output.

One specific embodiment of the invention is a process for making an optical device. The process includes fabricating a fiber assembly having a plurality of optical fibers and a first fiducial on a substrate and fabricating an optical plate having a second fiducial. The first fiducial can be an opaque object such as a carbon-coated fiber in a groove that is substantially identical to grooves containing the optical fibers. Alternatively, the first and/or second fiducials can be formed using photolithographic processes that provide the required precision for the positions of the first and second fiducials relative to optical fibers and optical waveguides, respectively.

With the fiber assembly and optical plate thus fabricated, the process further includes identifying locations for the first and second fiducials and moving the fiber assembly relative to the optical plate until the first and second fiducials reach a target relative position. The target relative position provides coarse alignment of the fiber assembly and the optical plate. The process can further include fine alignment that measures optical power flowing through fiber assembly and the optical plate and adjusts the relative position of the fiber assembly and optical plate to maximize the optical power.

Identifying the locations for the first and second fiducials can be done by applying computer vision to an image of the fiber assembly and the optical plate and then computing a relative movement of the fiber assembly and/or the optical plate required to reach the target relative positions. Alternatively, a measuring device such as an interferometer can measure distances to the first and second fiducials and fiducial edges for angular information. A relative movement of the fiber assembly and the optical plate required to reach the target relative positions can be computed from the measurements.

Another embodiment of the invention is an optical device such as a fiber assembly or an optical switch. The device generally includes a substrate having grooves formed in a surface. Optical fibers are in a set of the grooves on the surface of the substrate, and an opaque fiducial is in a groove that does not contain an optical fiber for light guiding. The fiducial can be an opaque cylindrical object such as a carbon-coated fiber. For an embodiment of an optical switch, the device further includes an optical plate to which the substrate is attached. The optical plate contains a light circuit including optical waveguides that are respectively aligned with the optical fibers. In contrast, the opaque fiducial is aligned with a portion of the optical plate that is not a functional optical waveguide for optical signals.

BRIEF DESCRIPTION OF THE DRAWINGS

Use of the same reference symbols in different figures indicates similar or identical items.

DETAILED DESCRIPTION

Figure 1A:
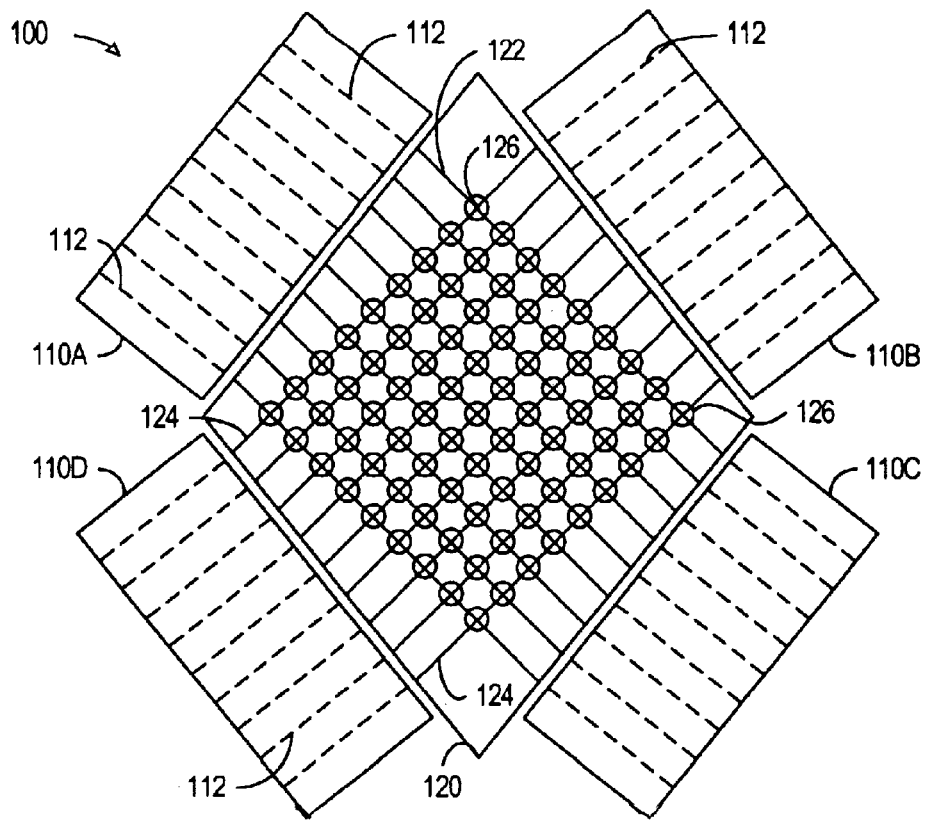
FIG. 1A shows a plan view of an optical switch with attached fiber assemblies.
Figure 1B:
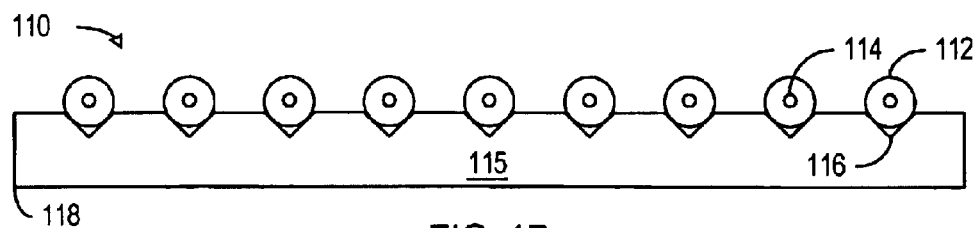
FIG. 1B is a cross-sectional view of a conventional fiber assembly.
Figure 2A:
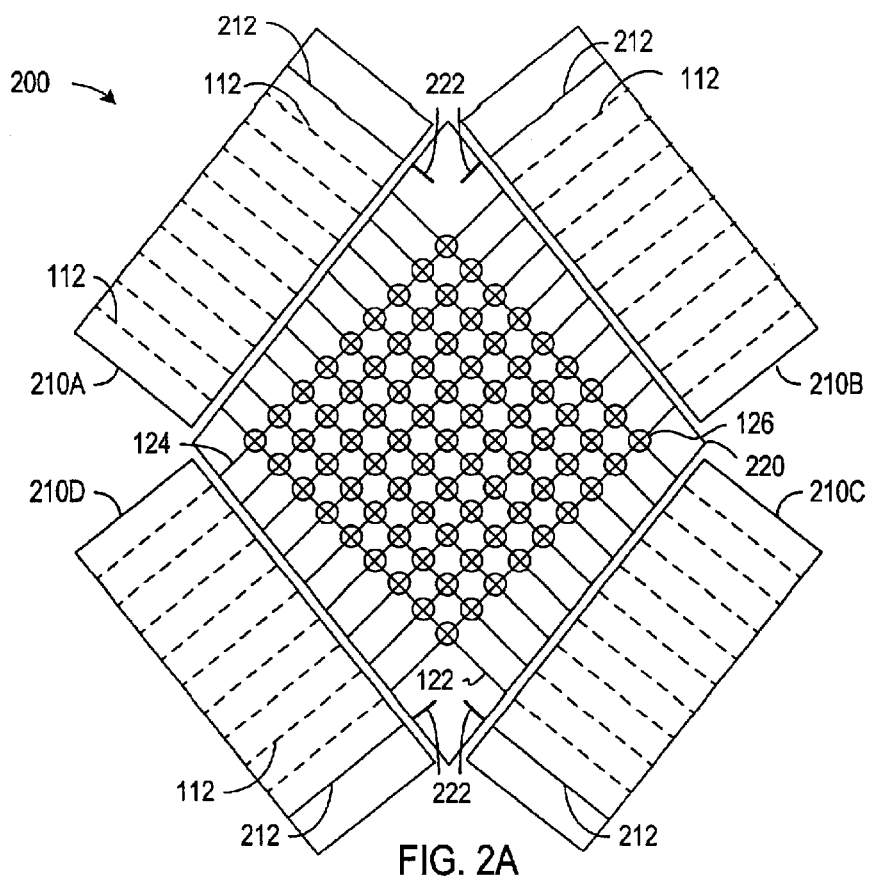
FIG. 2A shows a plan view of an optical switch in accordance with an embodiment of the invention.

In accordance with an aspect of the invention, a fiber assembly and an optical element have fiducials that a coarse alignment process uses during assembly of an optical device. FIG. 2A shows a schematic plan view of an optical switch 200 in accordance with an embodiment of the invention. Optical switch 200 includes four optical assemblies 210A, 210B, 210C, and 210D and an optical plate 220 containing a planar lightwave circuit (PLC). Each of optical assemblies 210A, 210B, 210C, and 210D contains multiple optical fibers 112 and a fiducial 212.

Optical plate 220 includes two sets of optical waveguides 122 and 124 that intersect at switching sites 126, which can have conventional designs. Optical plate 220 differs from known optical plates primarily in the addition of fiducials 222 for use in coarse alignment of fiber assemblies 210A to 210D during fabrication of optical switch 200. Fiducials 222 are regions commonly made of an opaque material such as a metal, a photoresist, or a semiconductor or are etched regions that reflect, diffract or otherwise enhance the visibility of fiducials 222 using a process that can be patterned with precise alignment relative to switching sites 126.

In an exemplary embodiment of the invention, optical plate 220 is a plate of fused silica or other optical quality material that is processed to form waveguides and trenches at the switching sites 126. One conventional fabrication process for forming waveguides 122 and 124 begins with depositing or finding a suitable substrate for the lower cladding. Core material, which has a slightly higher refractive index than the cladding, is deposited on the lower cladding and then patterned using photoresist and an etch to form beam paths or waveguides 122 and 124. Upper cladding is then deposited over waveguide 122 and 124 so that as an optical signal travels down a waveguide 122 and 124, a refractive index step is in every direction perpendicular to the direction of propagation. The light thus stays in the waveguide. Etching then forms trenches in optical plate 120 at intersections of optical waveguides 122 with optical waveguides 124. Further descriptions of techniques for forming an optical switch can be found, fore example, in U.S. Pat. No. 6,324,316, entitled "Fabrication Of A Total Internal Reflection Optical Switch With Vertical Fluid Fill-Holes" to Fouquet et al. and U.S. Pat. No. 6,195,478, entitled "Planar Lightwave Circuit-Based Optical Switches Using Micromirrors in Trenches" to J. Fouquet.

When fabricating optical plate 220, conventional photolithographic techniques such as those well known in integrated circuit manufacture can precisely define the locations of optical waveguides 122 and 124 and the portions of optical plate 220 removed to form switching sites 126. Such processes generally use alignment marks on optical plate 220 when positioning and orienting optical plate 220 for processing. In accordance with an aspect of the invention, alignment marks formed and used for alignment of photolithography can also be used as fiducials 222 for coarse alignment of fiber assemblies 210A to 210D to optical plate 220. Alternatively, fiducials 222 can be formed especially for alignment of fiber assemblies 210A to 210D.

Figure 2B:
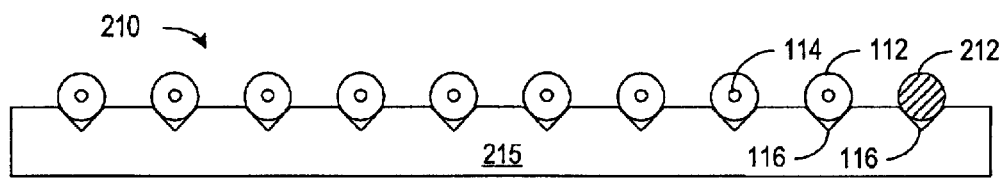
FIGS. 2B and 2C are cross-sectional views of fiber assemblies in accordance with alternative embodiments of the invention.
Figure 2C:
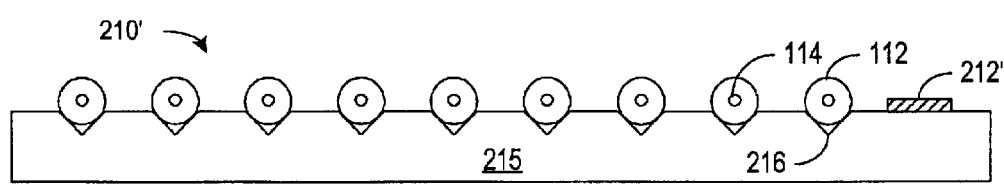

FIGS. 2B and 2C show cross-sectional views of respective optical assemblies 210 and 210' in accordance with alternative embodiments of the invention. Optical assemblies 210 and 210' are generic versions of optical assemblies 210A, 210B, 210C, and 210D in that positions of optical fibers 112 and fiducials 212 in optical assemblies 210 and 210' do not necessarily match the positions of matching structures in any particular one of optical assemblies 210A, 210B, 210C, and 210D. Fiber assemblies 210A, 210B, 210C, and 210D may differ as required to match optical waveguides 122 or 124 or fiducial marks 222 on optical plate 220. In particular, left-handed and right-handed assemblies can attach to different sides of optical plate 220.

FIG. 2B shows an embodiment of fiber assembly 210 in which fiducial 212 resides in a groove 116 in a substrate 215. Substrate 215 can be made of any materials suitable for attaching to optical plate 220 and for holding optical fibers 112. In an exemplary embodiment of the invention, substrate 215 and optical plate 220 are made of the same material (e.g., fused silica), but substrate 215 can alternatively be semiconductor or ceramic substrate.

Grooves 116 can be machined in substrate 215 with a spacing that is tightly controlled (e.g., to within a tolerance of about ±1 $\mu$m). Grooves 116 are preferably v-grooves to better hold optical fibers 112 in the proper positions. Such grooves can be formed using a precision sawing or grinding equipment. Generally, equipment for mechanical processes such as sawing or grinding are not capable of using alignment marks or otherwise creating fiducials 212 having positions that are reliable to the required accuracy.

According to an aspect of the invention, fiducial 212 can be in one of the precisely spaced grooves. FIG. 2B illustrates an embodiment of the invention in which fiducial 212 is an opaque cylindrical object in one of grooves 116. To provide a consistent reference position, the diameter of a cylindrical object should be highly uniform (e.g., varying by less than ±1 $\mu$m in diameter along the length of the object) and roughly the same as that of an optical fiber 124 so that the object fits well in groove 116. Some examples of suitable cylindrical objects include opaque fibers, precision needles, and wires.

In a preferred embodiment of the invention, fiducial 212 is a carbon-coated optical fiber. Carbon-coated fibers are well known in the art and commercially available from suppliers such as Sumitomo Electric Lightwave Corp., Fujikura America, Inc., or Corning, Inc. Carbon-coated fibers desirably have a precisely controlled diameter of 125 $\mu$m±1 $\mu$m, the same as other standard optical fibers, and have the same thermal and mechanical properties (e.g., the same coefficient of thermal expansion) as optical fibers 112. Carbon-coated fibers also provide a high contrast with many materials that can be used for substrate 215. In particular, carbon-coated fibers provide high contrast when substrate 215 is transparent. In addition, the opaque coating can be detected with interferometer type sensors when substrate is transparent or non-transparent.

FIG. 2C illustrates an alternative fiber assembly 210' having a fiducial 212' that is a visible region on substrate 215. Visible region 212' has a position related to grooves 216 that is accurate to a precision of about ±1 $\mu$m. Photolithographic processes and patterning can achieve the required accuracy for formation of visible region 212'. Generally, such photolithographic processes use silicon for substrate 215 since the crystal structure in a silicon substrate 215 facilitates etching of v-grooves 216.

A coarse alignment process can use fiducials 212 and 222 to position fiber assemblies 210A, 210B, 210C and 210D for attachment to optical plate 220. The coarse alignment begins by identifying the locations of fiducials 212 and 222 on a fiber assembly 210, which can be done manually or with a computer-controlled process.

For a manual process, fiducials 212 and 222 provide visual contrast that facilitates identifying features that must be aligned to provide the desired coarse alignment. In particular, a person aligning a fiber assembly 210 with an optical plate 220 can move the fiber assembly until fiducials 212 and 222 line up or reach some other target configuration. Since fiducials 212 and 222 have accurate positions and are easily identified, aligning fiducials 212 and 222 reliably provides a configuration that transmits sufficient optical power for a fine alignment process, and a further search operation is generally not required.

For one computer-controlled process, either optical plate 220 or fiber assembly 210 is fixed while the other is mounted on a precision stage. An image of fiber assembly 210 and optical plate 220 is then taken and digitized, and conventional computer vision software identifies fiducials 212 and 222 in the image, which is correlated to the spatial coordinates of fiber assembly 210 and optical plate 220. Unlike prior fiber assemblies and optical plates where features such as optical fibers were difficult to identify, fiducials 212 and 222 provide high image contrast that enables reliable use of computer vision. The computer can then determine relative positions and orientations of optical plate 220 and fiber assembly 210 and instruct the precision stage to move optical plate 220 or fiber assembly 210 from the determined position to a target position that provides the desired coarse alignment. The target position depends on the locations of fiducials 212 and 222 and can be calculated in a straightforward manner.

An alternative computer-controlled coarse alignment process uses an interferometer system such as available from Keyence, Inc. With an interferometer, the contours of the surfaces of fiber assembly 210 and optical plate 220 can be measured. Since fiducials 212 and 222 are opaque, the distances to points on fiducials 212 and 222 can be precisely measured and will stand out from the surrounding background. Multiple points on fiducial 212 and 222 can be used to calculate position (x,y,z) and the angular orientation (pitch, yaw, and roll) for fiber assembly 210 and optical plate 220. The fiber assembly 210 can then be moved relative to optical plate 220 until fiducials 212 and 222 have their target relative positions.

Figure 3:
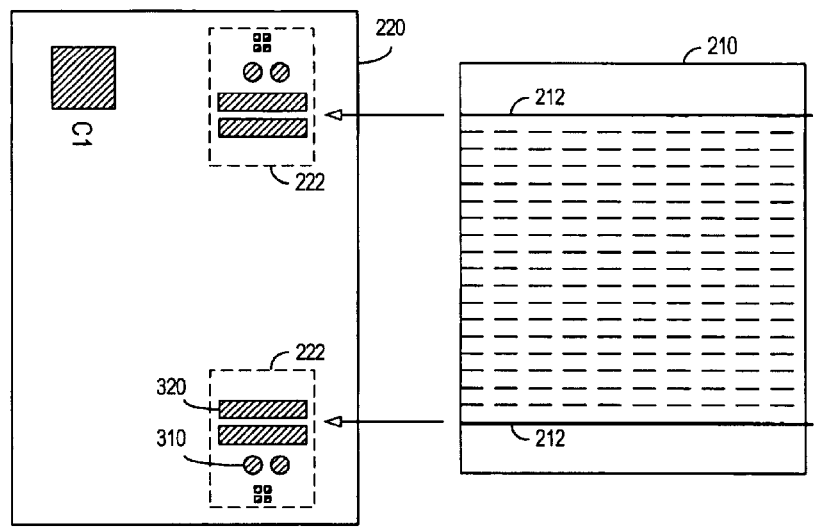
FIG. 3 shows a plan view of an optical plate and a fiber assembly having fiducials in accordance with an embodiment of the invention.

As an example of a particular pattern for fiducials, FIG. 3 illustrates a fiber assembly 210 near a portion of an optical plate 220 having one possible pattern for fiducial 222. In the illustrated embodiment, fiducial 222 includes circular shapes 310 that computer vision can easily identify. Additionally, rectangular regions 320 define a direction and position for fiducials 212 that are readily identified by the human eye. In the embodiment of FIG. 3, two fiducials 212 are provided at opposite ends of assembly 210, and the target position that achieves coarse alignment has fiducials 212 aligned with a gap between rectangular regions 320.

A practically endless variety of other configurations are possible for the fiducials. In particular, any number of fiducials 212 can be employed and located anywhere on fiber assembly 210. When fiducials 212 are in grooves, any groove not used for an optical fiber is available for containing a fiducial 212. Additionally, the target positions of fiducials 212 and 222 may have fiducials 212 and 222 offset from each other rather than being aligned as shown in FIG. 3.

Figure 4:
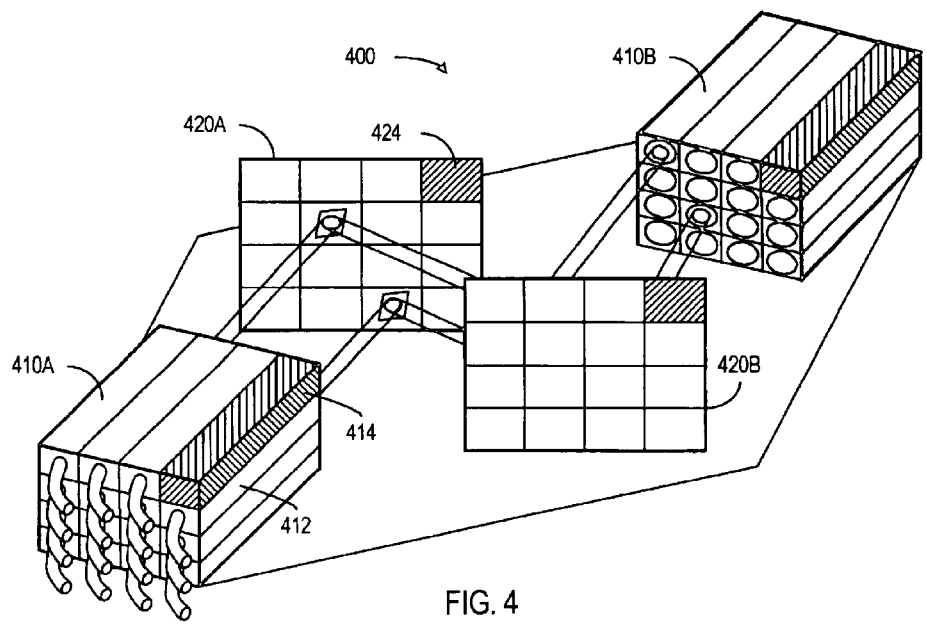
FIG. 4 shows a perspective view of a micro electronic machine using fiducials for coarse alignment of components.

Embodiments of the invention are not limited to optical systems including one-dimensional arrays of optical fibers. FIG. 4 is a perspective view of an embodiment of the invention that is micro electronic machine (MEM) 400 including two-dimensional collimator arrays 410A and 410B that are aligned with mirror arrays 420A and 420B. Conventional collimator arrays contain an array of collimator lenses that are transparent and therefore can be difficult to precisely align. In operation, collimators 412 in collimator array 410A or 410B receive input optical signals from optical fibers. Collimators 412 focus the optical signals onto respective micro-mirrors in mirror array 420A or 420B. The angle of each micro-mirror in mirror array 120A or 120B is adjustable about two axes to permit reflection of a received optical signal to any mirror in mirror array 120B or 120A, and the mirror receiving the reflected signals is adjustable to direct the reflected optical signal into the collimators 412 corresponding to the receiving mirror.

Fiducials 414 and 424 on collimator arrays 410A and 410B and mirror arrays 420A and 420B aid aligning collimator arrays 410A and 410B with mirror arrays 420A and 420B. In accordance with an aspect of the invention, aligned processes such as photolithography used to form collimator arrays 410A and 410B or mirror arrays 420A and 420B can form fiducials 414 and 424 as visible regions having the positional accuracy required for the alignment process. Alternatively, mechanically assembled structures in collimator array 410A or 410B can be replaced with structures that are more visible to act as fiducials 414 and 424 during alignment processes. For example, an opaque lens can replace one of the collimator lenses in a mechanical assembly process for a collimator array. The opaque lens can then act as a fiducial that is accurate to the same precision as the collimator lenses.

Although the invention has been described with reference to particular embodiments, the description is only an example of the invention's application and should not be taken as a limitation. In particular, although the above embodiments describe alignment of optical assemblies with particular optical elements such as a planar lightwave circuit or a MEM device, alignment processes in accordance with the invention can use fiducials when aligning an optical assembly with other optical elements such as gratings, liquid crystals, another optical assembly, or any optical element that requires precise alignment for operations on multiple optical signals. Various other adaptations and combinations of features of the embodiments disclosed are within the scope of the invention as defined by the following claims.

What is claimed is:

1. A process for making an optical device, comprising:
    fabricating an optical assembly including a first fiducial and a plurality of optical paths;
    fabricating an optical element having a second fiducial;
    moving the optical assembly relative to the optical element until the first and second fiducials have target relative positions calculated to provide a coarse alignment of the optical assembly and the optical element; and
    performing a finer alignment procedure utilizing movement of the optical assembly and the optical element away from the target relative positions providing the coarse alignment.

2. The process of claim 1, wherein the optical element comprises a plurality of optical paths, and the target relative positions align optical paths in the optical assembly respectively with the optical paths in the optical element.

3. The process of claim 2, wherein the optical element comprises an element selected from the group consisting of gratings, planar lightwave circuit, liquid crystals, and micro electronic machined devices.

4. The process of claim 1, wherein fabricating the optical assembly comprises:
    forming grooves in a substrate; and
    mounting optical fibers and the first fiducial in the grooves.

5. The process of claim 4, wherein forming the grooves comprises grinding the grooves in the substrate.

6. The process of claim 1, wherein the optical assembly comprises an assembly of optical paths constructed with optical fibers on a substrate, wherein the optical fibers provide the plurality of optical paths.

7. The process of claim 1, wherein the optical assembly comprises an array of collimator lenses.

8. The process of claim 1, further comprising measuring optical power flowing through the optical assembly and the optical element after the coarse alignment, wherein performing the finer alignment procedure maximizes the optical power measured.

9. A process for making an optical device, comprising:
fabricating an optical assembly including a first fiducial and a plurality of optical fibers on a substrate, wherein the first fiducial is an opaque fiber;
fabricating an optical element having a second fiducial; and
moving the optical assembly relative to the optical element until the first and second fiducials have target relative positions calculated to align the optical assembly and the optical element.

10. The process of claim 9, wherein the opaque fiber is a carbon-coated fiber.

11. A process for making an optical device, comprising:
fabricating an optical assembly including a first fiducial and a plurality of optical paths, wherein fabricating the optical assembly comprises:
  etching a substrate to form a plurality of grooves in the substrate;
  mounting optical fibers in the grooves; and
  forming on the substrate a pattern including the first fiducial, wherein
  the etching and the forming of the pattern are aligned with each other using photolithography;
fabricating an optical element having a second fiducial; and
moving the optical assembly relative to the optical element until the first and second fiducials have target relative positions calculated to align the optical assembly and the optical element.

12. A process for making an optical device, comprising:
fabricating an optical assembly including a first fiducial and a plurality of optical paths;
fabricating an optical element having a second fiducial;
applying computer vision to an image of the optical assembly and the optical element;
computing a relative movement of the optical assembly and the optical element required to reach target relative positions calculated to align the optical assembly and the optical element; and
moving the optical assembly relative to the optical element until the first and second fiducials have the target relative positions.

13. A process for making an optical device, comprising:
fabricating an optical assembly including a first fiducial and a plurality of optical paths;
fabricating an optical element having a second fiducial;
measuring distances to points on the first and second fiducials;
computing from the distances a relative movement of the optical assembly and the optical element required to reach target relative positions calculated to align the optical assembly and the optical element; and
moving the optical assembly relative to the optical element until the first and second fiducials have the target relative positions.

14. An optical device comprising:
an optical assembly including a first fiducial and a plurality of optical paths; and
an optical element having a marking that forms a second fiducial, wherein
the first and second fiducials have target relative positions calculated to provide coarse alignment of the optical assembly and the optical element.

15. The optical device of claim 14, wherein the optical assembly comprises a fiber assembly including optical fibers on a substrate, wherein the optical fibers provide the optical paths.

16. The optical device of claim 14, wherein the optical element comprises an element selected from the group consisting of gratings, planar lightwave circuit, liquid crystals, and micro electronic machined devices.

17. The optical device of claim 14, wherein the marking comprises an opaque material selected from the group consisting of metal, photoresists, and semiconductors.

18. An optical device comprising:
a substrate having grooves formed in a surface of the substrate, wherein all of the grooves are substantially identical;
a plurality of optical fibers mounted in a set of the grooves on the surface of the substrate; and
a fiducial mounted in one of the grooves.

19. The device of claim 18, wherein the fiducial comprises a carbon-coated fiber.

20. The device of claim 18, further comprising a planar lightwave circuit to which the substrate is attached, the planar lightwave circuit containing optical waveguides that are respectively aligned with the optical fibers, wherein the fiducial is aligned with a portion of the optical plate that is not a functional optical waveguide.

21. The device of claim 18, wherein the fiducial comprises an opaque object.

22. The device of claim 18, wherein the surface in which the grooves are formed is substantially planar.

23. The device of claim 18, wherein the fiducial is a cylindrical object.

* * * * *